United States Patent
Nainar et al.

(10) Patent No.: US 11,582,140 B2
(45) Date of Patent: Feb. 14, 2023

(54) OAM-BASED SUBOPTIMAL ECMP PATH DETECTION IN SOFTWARE-DEFINED FABRIC

(71) Applicant: Cisco Technology, Inc., San Jose, CA (US)

(72) Inventors: Nagendra Kumar Nainar, Morrisville, NC (US); Pascal Thubert, Roquefort les Pins (FR); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 36 days.

(21) Appl. No.: 17/123,294

(22) Filed: Dec. 16, 2020

(65) Prior Publication Data
US 2022/0191130 A1 Jun. 16, 2022

(51) Int. Cl.
*H04L 12/733* (2013.01)
*H04L 45/00* (2022.01)
*H04L 45/74* (2022.01)
*H04L 45/24* (2022.01)
*H04L 12/707* (2013.01)

(52) U.S. Cl.
CPC .............. *H04L 45/20* (2013.01); *H04L 45/24* (2013.01); *H04L 45/74* (2013.01)

(58) Field of Classification Search
None
See application file for complete search history.

(56) References Cited

U.S. PATENT DOCUMENTS

| | | | | |
|---|---|---|---|---|
| 10,038,601 | B1* | 7/2018 | Becker | H04L 45/24 |
| 10,320,691 | B1* | 6/2019 | Matthews | H04L 45/24 |
| 2012/0170575 | A1 | 7/2012 | Mehra | |

(Continued)

FOREIGN PATENT DOCUMENTS

WO 2017148139 A1 9/2017

OTHER PUBLICATIONS

J. Korhonen, Ed. et al., "DetNet Data Plane Protocol and Solution Alternatives draft-dt-detnet-dp-alt-00", DetNet, Mar. 21, 2016, 106 pages.

(Continued)

*Primary Examiner* — Eunsook Choi
(74) *Attorney, Agent, or Firm* — Edell, Shapiro & Finnan, LLC

(57) ABSTRACT

A node of a network configured to forward packets based on network programming instructions encoded in the packets, performs a method. The method includes generating a probe packet encoded with a replication network programming instruction. The replication network programming instruction is configured to validate equal-cost multi-path (ECMP) routing in the network from the node to a destination by remotely triggering transit nodes of the network, that are traversed by the probe packet, to each perform replicate-and-forward actions. The replicate-and-forward actions include: identifying ECMP paths toward the destination; generating, for the ECMP paths, replicated probe packets that each include the replication network programming instruction; and forwarding the replicated probe packets along the ECMP paths. The method further includes forwarding the probe packet toward the destination.

20 Claims, 9 Drawing Sheets

(56) References Cited

U.S. PATENT DOCUMENTS

| | | | |
|---|---|---|---|
| 2015/0257081 A1* | 9/2015 | Ramanujan | H04L 45/24 |
| | | | 370/329 |
| 2017/0126481 A1 | 5/2017 | Pignataro et al. | |
| 2018/0176134 A1* | 6/2018 | Pignataro | H04L 69/22 |
| 2019/0334798 A1 | 10/2019 | Zheng et al. | |
| 2020/0177498 A1* | 6/2020 | Thomas | H04L 43/10 |
| 2022/0086078 A1* | 3/2022 | Sivabalan | H04L 45/12 |

OTHER PUBLICATIONS

Angelo Tulumello et al., "Micro SIDs: a solution for Efficient Representation of Segment IDs in SRv6 Networks", 2020 16th International Conference on Network and Service Management (CNSM), Oct. 16, 2020, 12 pages.

* cited by examiner

US 11,582,140 B2

OAM-BASED SUBOPTIMAL ECMP PATH DETECTION IN SOFTWARE-DEFINED FABRIC

TECHNICAL FIELD

The present disclosure relates to equal-cost multi-path (ECMP) routing in networks that employ software-defined networking.

BACKGROUND

Network nodes (referred to simply as "nodes") of a software-defined fabric (SDF) may be interconnected in a leaf-spine topology. The nodes may employ equal-cost multi-path (ECMP) routing to forward packets along optimal ECMP paths to a destination. The network nodes advertise routes to one another and update next hop (NH) ECMP entries in forwarding tables of the network nodes based on the advertising. Often, the ECMP entries may include stale entries that do not accurately reflect recent path/link failures. Reasons for this may include slow control plane convergence, control plane-data plane synchronization problems, missing advertisement updates, and so on. The stale entries can result in packet forwarding along suboptimal paths. Operations, Administration, and Maintenance (OAM) probe techniques, i.e., sending of OAM probes through the network, may be used to detect the network failures, and thus enable the nodes to update their forwarding tables accordingly; however, conventional OAM probe techniques may fail to detect certain type of network failures due to the manner in which time-to-live (TTL) values for the probes are computed, in combination with the nature of route advertisement and forwarding table construction in the leaf-spine topology.

DESCRIPTION OF EXAMPLE EMBODIMENTS

Overview

In accordance with embodiments presented herein, a node of a network is configured to forward packets based on network programming instructions encoded in the packets. The node performs a method that includes generating a probe packet encoded with a replication network programming instruction. The replication network programming instruction is configured to validate equal-cost multi-path (ECMP) routing in the network from the node to a destination by remotely triggering transit nodes of the network, that are traversed by the probe packet, to each perform replicate-and-forward actions. The replicate-and-forward actions include: identifying ECMP paths toward the destination; generating, for the ECMP paths, replicated probe packets that each include the replication network programming instruction; and forwarding the replicated probe packets along the ECMP paths. The method further includes forwarding the probe packet toward the destination.

Example Embodiments

Figure 1:
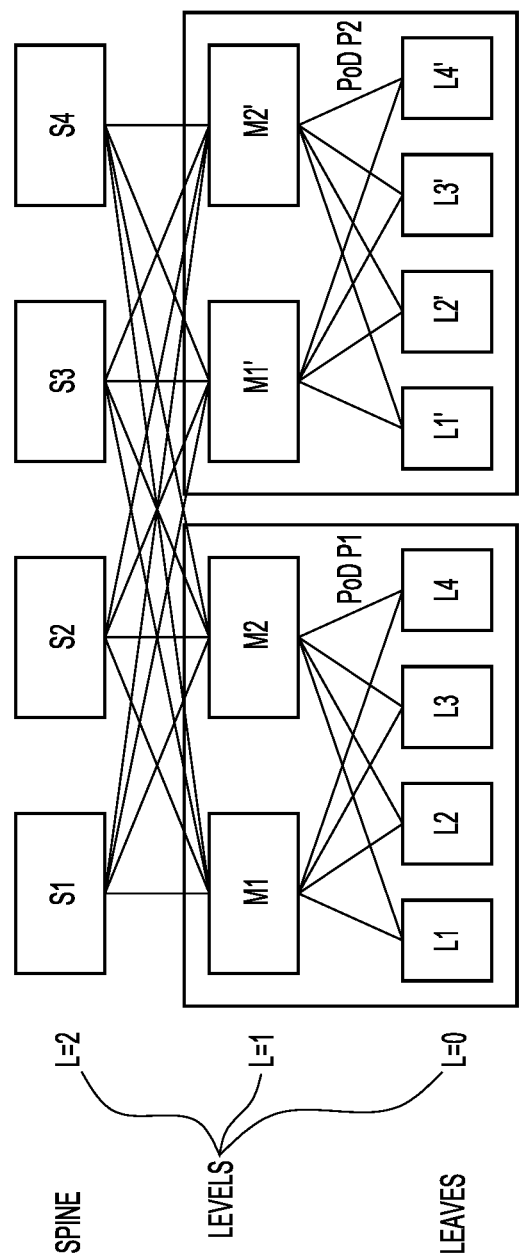
FIG. 1 is a block diagram of a network having network nodes (referred to simply as "nodes") arranged according to a leaf-spine topology, and in which embodiments directed to OAM-based suboptimal ECMP path detection may be implemented, according to an example embodiment.

With reference to FIG. 1, there is shown a block diagram of an example network 100 configured for software-defined networking (SDN). Thus, network 100 may also be referred to as an SDN network. Network 100 may include a software-defined fabric (SDF) that may be deployed in a data center, for example. Network 100 includes network nodes (referred to simply as "nodes") arranged and interconnected in a topology that follows a common leaf-spine model, for example. The nodes of network 100 implement one or more segment routing protocols to route traffic (i.e., data packets) through the network. For example, network 100 may be based on the SRv6 network programming framework, or an extension of the SRv6 framework described below, that uses network programming instructions in the form of micro programs to route traffic (i.e., data packets) across the network. The nodes of network 100 may each include any network device, such as a router or a switch, and may be implemented as a virtual network device, for example. In other embodiments, the nodes may include physical network devices. Although network 100 is shown with a leaf-spine topology, the network may be modeled according to other topologies, i.e., that are not leaf-spine topologies.

The leaf-spine topology of network 100 includes hierarchical, or tiered, successively increasing levels L=0, L=1, and L=2 of the nodes. "L" represents an identifier (ID) of the level, i.e., a level ID. Lowest level L=0 is populated by leaf nodes L1-L4 and L1'-L4', intermediate level L=1 is populated by intermediate nodes M1, M2, M1', and M2', and highest or top level L=2 is populated by spine nodes S1-S4 each of which is connected to each of the intermediate nodes. Leaf nodes L1-L4 and L1'-L4' server as access nodes that connect to client and server devices (not shown). Generally, each of the lower-level/tier nodes is connected to each of the highest-level/top tier spine nodes S1-S4 in a full-mesh topology. That is, spine nodes S1-S4 form a backbone of network 100 that is responsible for interconnecting all of leaf switches L1-L4 and L1'-L4'. Traversal of the nodes of network 100 in a direction of increasing level (i.e., from lowest level L=0 toward highest level L=2) is referred to as forwarding/traversal in a northbound direction. Traversal of the nodes of network 100 in a direction of decreasing level (i.e., from highest level L=2 toward lowest level L=0) is referred to as forwarding/traversal in a southbound direction.

The leaf-spine topology of network 100 is optionally segmented into two pods P1 and P2. Pod P1 includes leaf nodes L1-L4 each connected to each of intermediate nodes M1 and M2. Pod P2 includes leaf nodes L1'-L4' each connected to each of intermediate nodes M1' and M2'. The nodes of pod P1 are connected to the nodes of pod P2 only through spine nodes S1-S4. More specifically, intermediate nodes M1, M2 of pod P1 are only connected to leaf nodes L1-L4 and spine nodes S1-S4, and intermediate nodes M1', M2' of pod P2 are only connected to leaf nodes L1'-L4' and the spine nodes.

The SRv6 network programming framework or its extension used by the nodes of network 100 to route traffic supports a variety of routing protocols, including, but not limited to, Routing in Fat Tree (RIFT), Intermediate System to Intermediate System (IS-IS), routing protocol for low-power and lossy networks (LLN) (RPL), and stability-aware load balancing (SL) for RPL (SL-RPL) protocols. The aforementioned routing protocols advertise default routes in the southbound direction, but advertise specific prefix-based routes in the northbound direction. For example, in the northbound direction, nodes L1-L4 advertise their full topology information to nodes M1, M2, which in turn advertise their fully topology information to nodes S1-S4, which thus collect a full topological view. In the southbound direction, nodes S1-S4 advertise only default topology information to nodes M1, M2, which in turn advertise only default topology information to nodes L1-L4.

Figure 2:
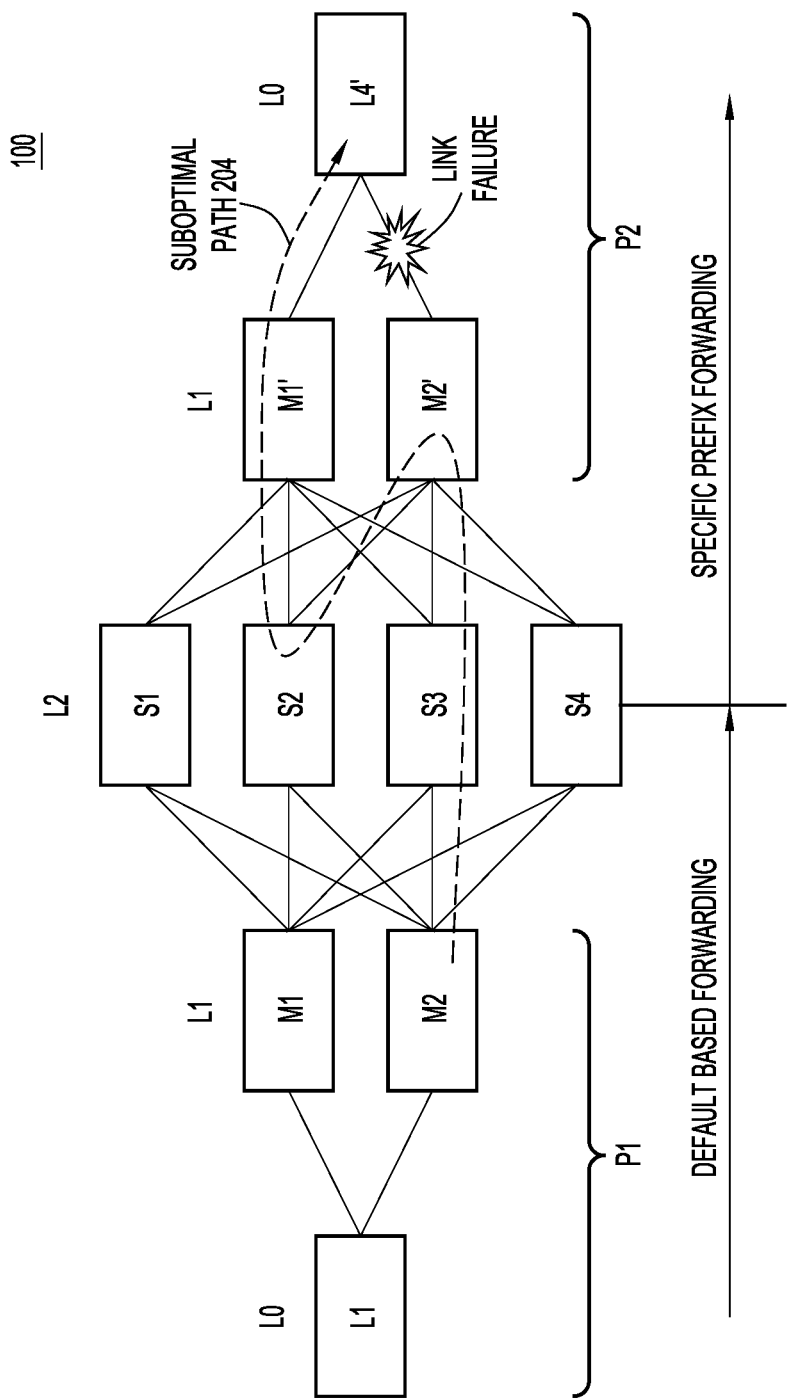
FIG. 2 is a block diagram of the network in which the view of the topology shown in FIG. 1 is rearranged to show connectivity specifically from a first leaf node of the topology to a second leaf node of the topology, and to show northbound and southbound forwarding based on route advertising, according to an example embodiment.

With reference to FIG. 2, there is a block diagram of network 100 in which the view of the topology shown in FIG. 1 is rearranged to show connectivity specifically from leaf node L1 to leaf node L4', and to show northbound and southbound route advertisement. Various traffic forwarding examples are now described in connection with the topology shown in FIG. 2. As mentioned above, according to routing protocols implemented in network 100, nodes of the network advertise specific routes in the northbound direction from leaf to spine, and advertise only default routes in the southbound direction from spine to leaf. The nodes of network 100 store the northbound and southbound advertised routes in local routing/forwarding tables (or simply "forwarding tables") of the nodes.

Forwarding of traffic by nodes of network 100 may be based on both the specific and the default forwarding information stored in the local forwarding tables. For example, when traffic flows from node L1 to node M1 within pod P1, node M1 has sufficient information in its forwarding tables to forward the traffic to node L2, directly, i.e., without first forwarding the traffic to the spine. On the other hand, when traffic forwarding is from node L1 in pod P1 to node L4' in pod P2, the forwarding uses default-based route lookup at node L1 to forward the traffic to M1, M2, default-based route lookup to forward the traffic from nodes M1, M2 to nodes S1-S4, and then more specific-based route lookups to forward the traffic from nodes S1-S4 to nodes M1', M2', and then to nodes L1'-L4'.

The nodes of network 100 may perform ECMP routing of traffic, i.e., forwarding of traffic along ECMP paths, based on next hop ECMP entries stored in the local forwarding tables of the nodes. Each ECMP path may be considered an optimal (shortest) path. Non-limiting examples of ECMP paths traversed by traffic from node L1 to node L4' in the topology of FIG. 2 in the absence of network failures include (i) a first ECMP path traversed using northbound forwarding (of traffic) from node L1 to node S3 via node M2, followed by southbound forwarding from node S3 to node L4' via node M2', and (ii) a second ECMP path traversed using northbound forwarding from node L1 to node S3 via node M2, followed by southbound forwarding from node S3 to node L4' via node M1'. Network 100 includes many similar ECMP paths. Forwarding along an optimal (ECMP) path may be based on a forwarding rule implemented by the nodes of network 100 that avoids reversals in the direction of forwarding specifically from southbound forwarding to northbound forwarding, i.e., that avoids forwarding in the southbound direction followed by forwarding in the northbound direction. Such a reversal results in forwarding along a suboptimal path that includes additional nodes or hops compared to the optimal path, as described below.

Now consider an example of traffic forwarding from node L1 to node L4' when the link between node M2' and node L4' fails, as shown in FIG. 2. Node L1 forwards the traffic to node M2. Under the failure scenario, forwarding of the traffic from node M2 to node L4' traverses or follows a path 204 that is successful, but suboptimal. Path 204 is suboptimal because it includes the above-mentioned reversal in the direction of forwarding from southbound forwarding to northbound forwarding at node M2'. More specifically, node M2 forwards the traffic to node S3. Node S3 has a forwarding table that includes stale next hop ECMP entries, is unaware of the link failure, and thus forwards the traffic to node M2'. Due to the link failure, node M2' uses the default route installed locally to forward the traffic destined for node L4' back to the spine, e.g., to node S2. This reversal results in the suboptimal path. In turn, node S3 forwards the traffic to node M1', which forwards the traffic to node L4'. Alternatively, the local forwarding table of node S3 may be "stuck" to forwarding the traffic back to node M2' as egress to node L4'. Reasons for this may include slow control plane convergence, a control plane-data plane synchronization problem, persistence of a stale entry in the local forwarding table, a missing advertisement update from node M2', and so on.

To detect link failures, the nodes of network 100 may use OAM probe techniques (referred to simply as "probe techniques") that send OAM probe packets (also referred to simply as "probes") through the network. In an example, an initiator node initiates sending of a probe to validate a path or paths to a destination, i.e., to check whether there is a network failure along the path. The probe is populated with a time-to-live (TTL) value. Each transit node traversed by the probe decrements the TTL value. If the TTL value does not expire along the path to the destination (i.e., the probe survives to the destination), the destination returns to the initiator node a positive result that indicates the path traversed by the probe does not include a link failure. If the probe expires (i.e., the TTL is decremented to zero) on a transit node, the transit mode returns a negative probe response to the initiator node. Ideally, the probe techniques should detect the failure described above so that subsequent forwarding of traffic can be adjusted to account for the failure, i.e., to forward the traffic along an alternative optimal (ECMP) path that avoids the failure.

Unfortunately, conventional probe techniques may not detect the link failure described above. That is, a conventional probe may survive all the way to the destination, notwithstanding the link failure. For example, when node M2 (or S3) sends the conventional probe to node M2' through node S3, node S3 may forward the probe in the southbound direction to M2' due the stale entry in the local forwarding table of node S3. In turn, M2', being aware of the link failure, matches forwarding to the default route stored in its local forwarding table, and forwards the probe back to one of nodes S1-S4 in the northbound direction, which may then forward the probe to node M1', and then to node L4', without expiry of the probe. As a result, the destination (L4') receives the probe and returns a false positive. Subsequently, traffic forwarded along path 204 will reach the destination, but the traffic will traverse the suboptimal path that includes the reversal in the forwarding direction from southbound forwarding (e.g., from spine node S3 to intermediate node M2') to northbound forwarding (e.g., from intermediate node M2' back to spine node S2), even though an alternative optimal ECMP path through M1' exists.

Embodiments presented herein avoid the above-described problems and present other advantageous features. More specifically, the embodiments avoid forwarding along suboptimal paths, such as in the scenario described above, and thus ensure forwarding along optimal/valid ECMP paths. According to the embodiments, a node of a network validates whether next-hop ECMP entries stored in a local forwarding table of the node are (i) optimal (e.g., the entries direct traffic over a valid ECMP path leading to a destination), or (ii) suboptimal (e.g., direct traffic over a path that includes redirection away from an optimal ECMP path on the way to the destination).

Embodiments presented herein may be based on an extension to the SRv6 network programming framework. The SRv6 network programming framework implements network programming instructions (i.e., a packet processing program) as a sequence of instructions referred to as segments. That is, each instruction is encoded in a SID, which is the size of an IPv6 address. The SIDs are encoded into a header of an IP packet. The extension to SRv6 presented herein employs a uSID construct to represent the packet processing program. Under the uSID construct, each instruction or SID of an SRv6 packet can carry a micro program. The micro program includes microinstructions represented with identifiers referred to as uSIDs. uSIDs are each represented with 2 bytes, which reduces packet overhead compared to non-uSID programs.

More specifically, the uSID construct includes a uSID active block in the form of a /32 or a /48 prefix, followed by a sequence of one or more uSIDs. The uSID active block represents a locator block for the subsequent uSIDs. Normally, when a node receives a packet encoded with the uSID active block followed by the sequence of uSIDs, the node parses the uSID block to locate a first uSID in the sequence (referred to as the "active SID"). The active SID represents the instruction currently been executed. The node performs an action/behavior defined by the active uSID, and then consumes the active uSID (i.e., pops the active uSID from the sequence). This exposes a next uSID in the sequence. The node forwards the packet to a next node, which may be as a result of executing the active SID, for example. The next node repeats the above-described process, except that the next uSID becomes the active SID for the next node.

The embodiments presented herein introduce a domain-wide unique uSID active block referred to as a "uSID replication active block" (also referred to as the "replicate-and-forward uSID active block"). The uSID replication active block is associated with a new forwarding semantic of "replicate the active SID, and forward it over all ECMP paths," or simply "replicate-and-forward" operations. The embodiments also introduce a new probe technique. According to the new probe technique, an initiator node (i.e., the node that originates/initiates sending of a probe) computes a TTL value for the probe based on the level in the topology that the node occupies, and based on the northbound or southbound direction that the initiator node will initially forward the probe. As will be described below, the combination of the uSID replication active block and the new probe technique detects link failures to ensure subsequent forwarding of traffic along optimal ECMP paths. That is, the combination may be used to validate all ECMP paths leading from a node to a destination in a network.

Figure 3:
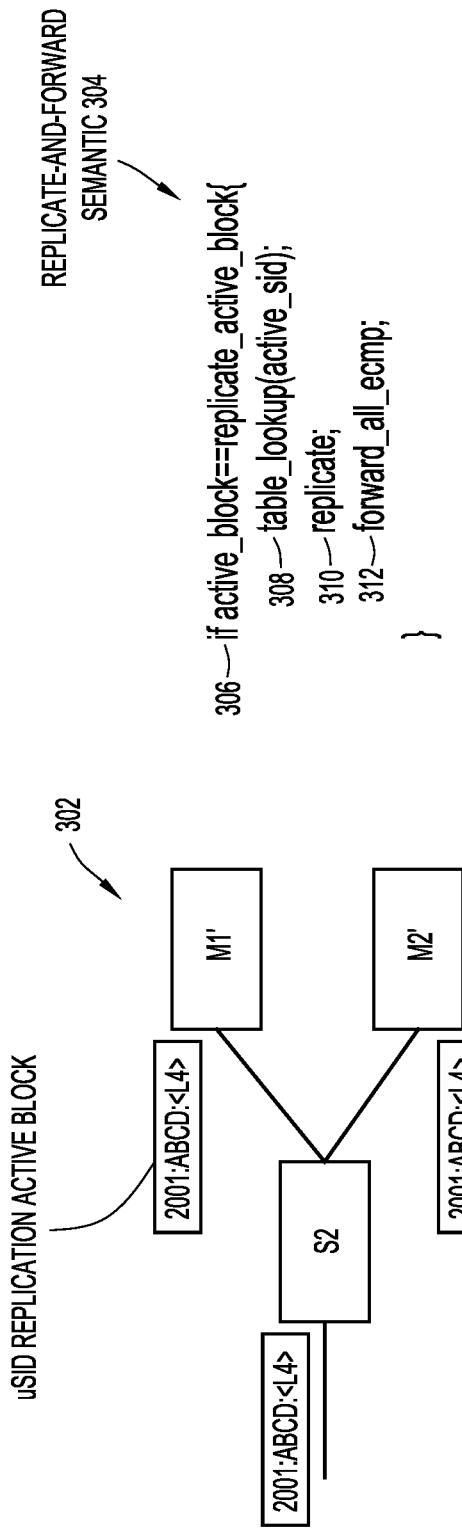
FIG. 3 is an example of a segment routing (SR) over Internet Protocol (IP) version (v) 6 over data plane (SRv6)-based network programming instruction in the form of a micro program that includes a micro (u) segment identifier (SID) (uSID) replication active block associated with an active SID, and that is used to validate ECMP paths in the network, according to an example embodiment.

Turning to FIG. 3, there is shown an example uSID replication active block associated with an active SID. The combination of the uSID replication active block and the active SID may be referred to, more generally, as a "replication network programming instruction" or a "replication micro program." As shown at 302, the example prefix "2001:ABCD::/48" is assigned as a unique domain-wide uSID replication active block, and example destination "<L4>" is the active SID. The active SID is concatenated with the uSID replication active block to form the micro program with active SID 2001:ABCD:<L4>. Generally, the uSID replication active block is used for OAM purposes (i.e., in probes for failure detection) and not necessarily for packet forwarding for data traffic. In other embodiments, the uSID replication active block may also be used for data traffic to realize deterministic network (Detnet) benefits in an SDF (e.g., for replicate and eliminate).

The new forwarding semantic or sequence of operations triggered by the uSID replication active block is shown at 304, and is described also with reference to the nodes shown at 302, which execute the operations of the semantic. When node S2 receives a packet (e.g., a probe) encoded with a uSID replication active block, at 306, the node accesses the uSID active block and determines whether the uSID active block matches the uSID replication active block (e.g., 2001:ABCD::/48). When there is such a match (e.g., the uSID active block=2001:ABCD::/48), node S2 accesses the active SID (e.g., destination of node L4'). At 308, node S2 performs a lookup in the local forwarding table for the active SID/destination (e.g., based on the address for node L4'). The lookup retrieves identifiers of next hops for all ECMP paths leading from the node S2 to the destination (e.g., to node L4'). In the example, because node S2 uses both M1' and M2' as egress to reach node L4', the lookup returns next hops to nodes M1' and M2', for a total of 2 ECMP next hops.

At 310, node S2 generates a number of new probes (referred to as replicated probes) equal to the total number of ECMP next hops (e.g., 2), and replicates in each of the replicated probes the uSID replication active block and the active SID (e.g., the replication micro program 2001:ABCD:<L4>). In the example, node S2 generates 2 replicated probes and encodes each of them with 2001:ABCD:<L4>. At 312, node S2 forwards the 2 replicated probes along respective ones of the ECMP paths identified at 308, i.e., forwards the replicated probes to ECMP next hop nodes M1' and M2'. When nodes M1' and M2 receive their respective replicated probes, the micro program encoded in each of the replicated probes triggers each of the nodes to repeat the new semantic operations performed by node S2.

The above-described replication network programming instruction (e.g., the replication micro program that includes the uSID replication active block and the active SID) encoded in the probe/replicated probes provides a mechanism by which upstream nodes (e.g., the initiator node) can remotely trigger downstream nodes (e.g., transit nodes) to perform the replicate-and-forward operations, defined by the semantic of the replication micro program, to validate all ECMP paths toward a destination. In other words, the replication network programming instruction, encoded in the probe/replicated probes forwarded by the upstream nodes, remotely triggers the downstream nodes, traversed by the probe/replicated probes, to perform the replicate-and-forward operations mentioned above, which validate all ECMP paths toward the destination.

As mentioned above, the embodiments also present a new probe technique performed in network 100. The new probe technique includes an algorithm by which an initiator node (also referred to as the "initiator") computes a TTL value for a probe. The algorithm computes the TTL value based on a direction in which ECMP path validation is being performed with respect to the initiator node (e.g. northbound or southbound), and as a mathematical function of a level of the leaf-spine topology that the initiator node occupies (e.g., level L=0, 1, 2, and so on), and of the level of the spine. The algorithm assumes that the nodes of network 100 are configured with, or may otherwise access, level identifiers of the levels in the leaf-spine topology that the nodes occupy, levels of adjacent nodes in the topology, and the highest level of the leaf-spine topology, i.e., the level occupied by the spine nodes.

The algorithm identifies the direction in which ECMP validation is to be performed, starting with the initiator, and then computes the TTL value according to the determined direction. That is, the initiator determines in which direction the initiator will forward the probe generated by the initiator. When the initiator occupies level n and the validation is to be performed in the southbound direction, the initiator computes the TTL value as simply n, i.e., TTL value=n. Conversely, when the validation is to be performed in the northbound direction, and the level of the spine is sn, the initiator computes the TTL value according to the equation: TTL value=2*sn−n. Thus the TTL value may differ depending on whether the initial probe forwarding is in the northbound or southbound direction.

For example, when the initiator is at level 2 and the spine is at level 3, the TTL is computed as follows:

a. For southbound, the TTL value is set to 2.
b. For northbound, the TTL value is set to 4.

Figure 4:
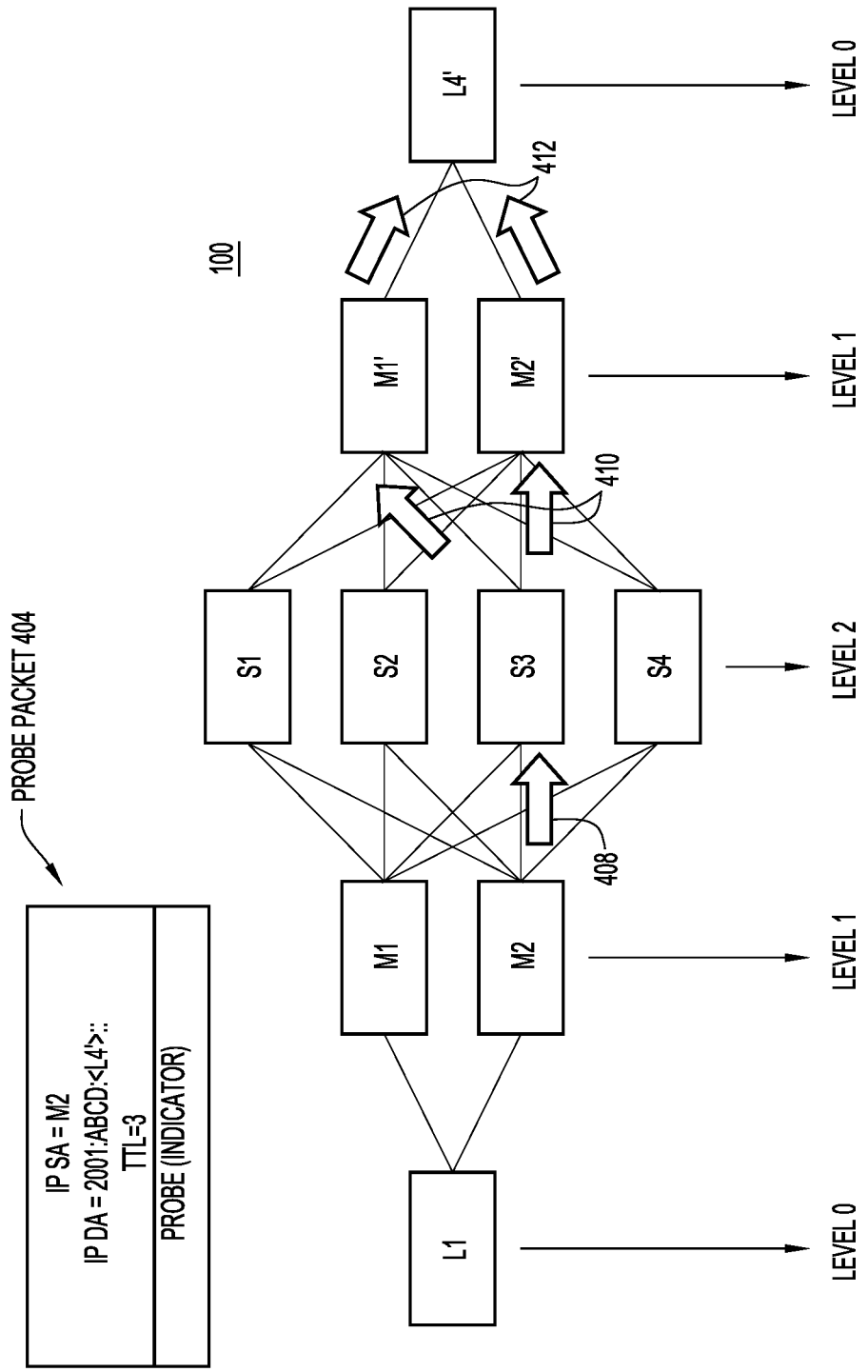
FIG. 4 is an illustration of ECMP path validation and failure detection in the network, in the absence of network failures, which combines a new OAM probe technique with the uSID replication active block, according to an example embodiment.

With reference to FIG. 4, there is an illustration of an example of ECMP path validation and failure detection in network 100 that combines the new probe technique with the uSID replication active block. In the example of FIG. 4, there are no link failures or stale ECMP entries in forwarding tables. Initiator M2 originates a probe packet 404 (i.e., probe 404) in the northbound direction to validate all ECMP paths leading to node L4'. Accordingly, probe 404 includes a packet header having an IP source address (SA)=M2 (i.e., an address for M2), and a destination address (DA) encoded with a replication micro program that includes uSID replication active block and active SID 2001:ABCD:<L4'>.

Initiator M2 computes a TTL value=3, as validation is in the northbound direction, node M2 is at level 1, and the spine is at level 2. Node M2 stores the TTL value in probe 404. At 408, node M2 forwards the probe 404 to S3.

Node S3 receives probe 404. In response to the uSID replication active block in probe 404, node S3 identifies the 2 ECMP paths to L4' based on the active SID (e.g., ECMP next hop nodes M1' and M2'), replicates probe 404 to produce 2 replicated probes each encoded with the uSID replication active block and active SID, decrements the TTL value to 2, and stores the new TTL in each of the replicated probes. At 410, node S3 forwards the replicated probes to respective ones of all of the ECMP paths, e.g., to nodes M1' and M2'.

Each node Mi' receives a respective one of the replicated probes, decrements the TTL to 1, and performs the replicate-and-forward operations in accordance with the uSID replication active block and active SID, as described above. At 412, each node Mi' forwards its replicated probe with TTL=1 to destination node L4. Destination node L4' receives each probe without expiry of the TTL, and thus returns to the network (e.g., ultimately to node M2) a positive response to each probe, i.e., 2 positive responses.

Figure 5:
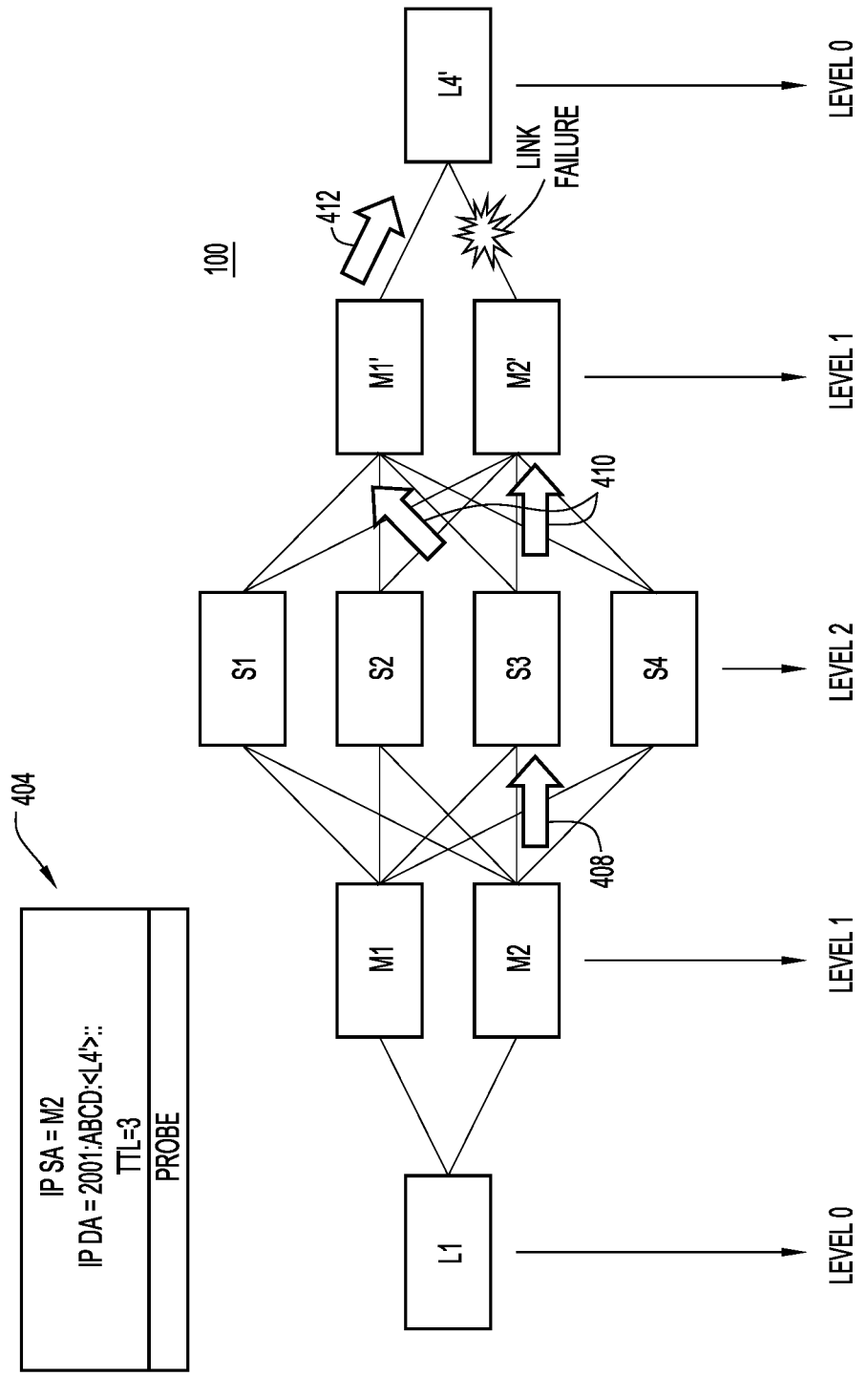
FIG. 5 is an illustration of ECMP path validation and failure detection in the network, in the presence of a network failure, which combines the new OAM probe technique with the uSID replication active block, according to an example embodiment.

With reference to FIG. 5, there is an illustration of another example of ECMP path validation and failure detection in network 100 that combines the new probe technique with the uSID replication active block. The example of FIG. 5 is similar to that of FIG. 4, except that in the example of FIG. 4, there is a link failure between nodes M2' and L4' that has not been registered at node S3. Thus, the MT link has failed, but node S3 still uses node MT as an ECMP path leading to node L4'. Accordingly, a first replicated probe sent by node S3 to node M1' traverses the good ECMP path S3→M1'→L4', and succeeds, i.e., reaches node L4' without expiry of the TTL value. On the other hand, node M2' receives a second replicated probe from node S3. Node M2' matches the second replicated probe to the default route due to the link failure, and forwards the second replicated probe, accordingly, e.g., back to the spine for subsequent forwarding to destination L4'. As a result, the second replicated probe traverses a suboptimal path toward node L4' that includes the reversal in direction that should be avoided, and fails due to TTL expiry. As a result, node M2 receives a negative response for the second replicated probe.

Figure 6:
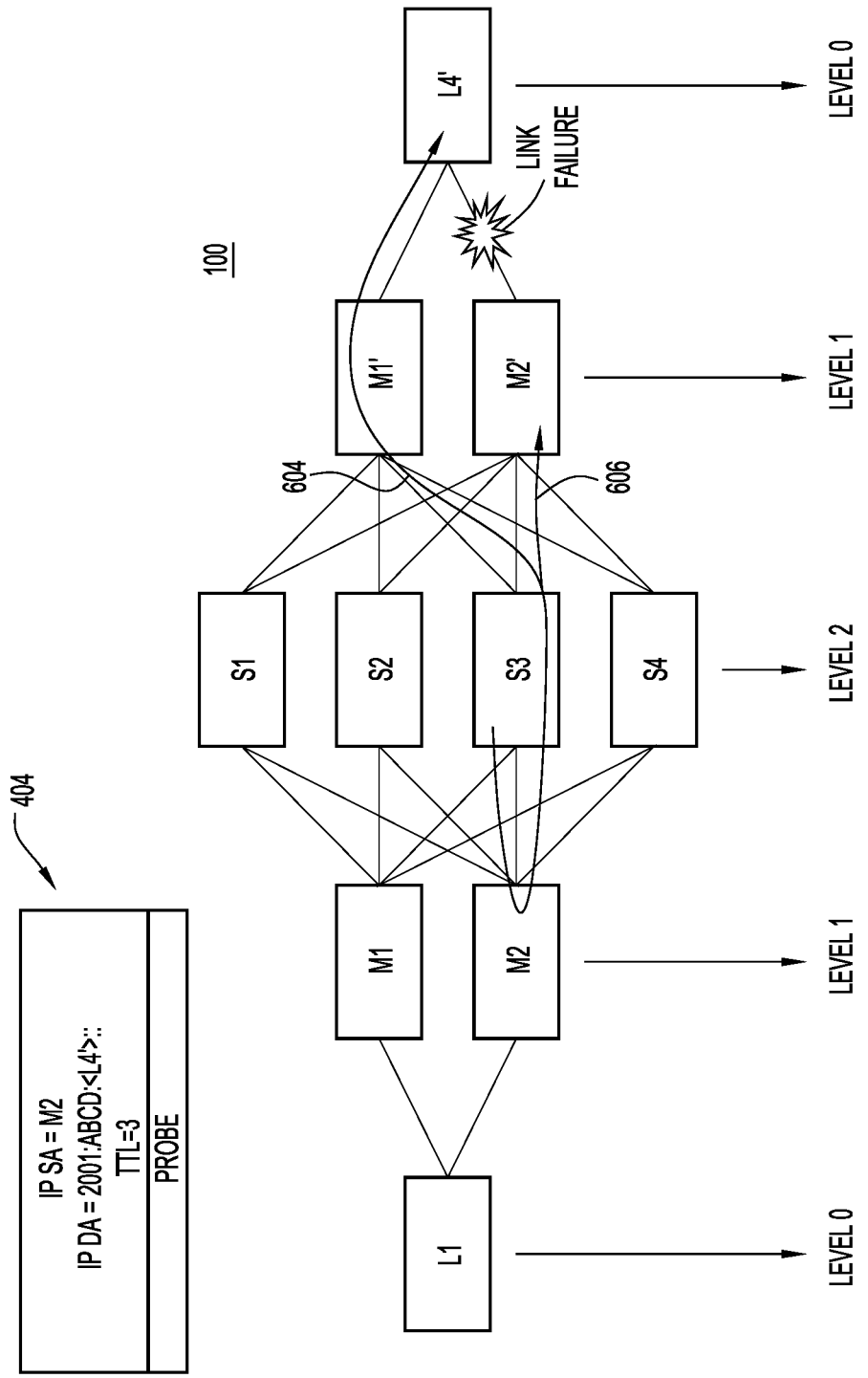
FIG. 6 is an illustration of a method of performing self-forwarding table validation using the uSID replication active block and the new OAM probe technique, according to an example embodiment.

With reference to FIG. 6, there is an illustration of an example method of performing self-forwarding table validation using the uSID replication active block and the new probe technique. This method is an extension of the techniques described above. For self-forwarding table validation, the TTL value computation varies slightly from that described above. Specifically, the TTL computation increases the northbound TTL value by one (i.e., northbound TTL value=2*sn−n+1), and increases the southbound TTL value by one (i.e., southbound TTL value=n+1). In the example of FIG. 6, node S3 intends to validate all ECMP paths to node L4', i.e., to ensure that all of the ECMP paths are optimal.

In order to do this, node S3 generates a probe encoded with the uSID replication active block, sets the TTL value in the probe based on the adjusted computation described above (i.e., increasing by one the TTL value described in connection with FIG. 3), and forwards the probe to a previous hop (e.g., node M2), with a rule set to trigger strict forwarding to self. When node M2 receives the probe, node M2 decrements the TTL value in the probe and returns the probe to S3. In turn, node S3 replicates and forwards the probe (i.e., sends 2 replicated probes) along 2 ECMP next hop paths 604 and 606 as shown, and expects to receive 2 probe responses from the network. If node S3 does not receive all of the expected probe responses, node S3 deduces that one of the ECMP paths is unstable. Node S3 can then trigger necessary action such as synchronizing the control plane with the data plane or re-installing forwarding entries, for example.

Figure 7:
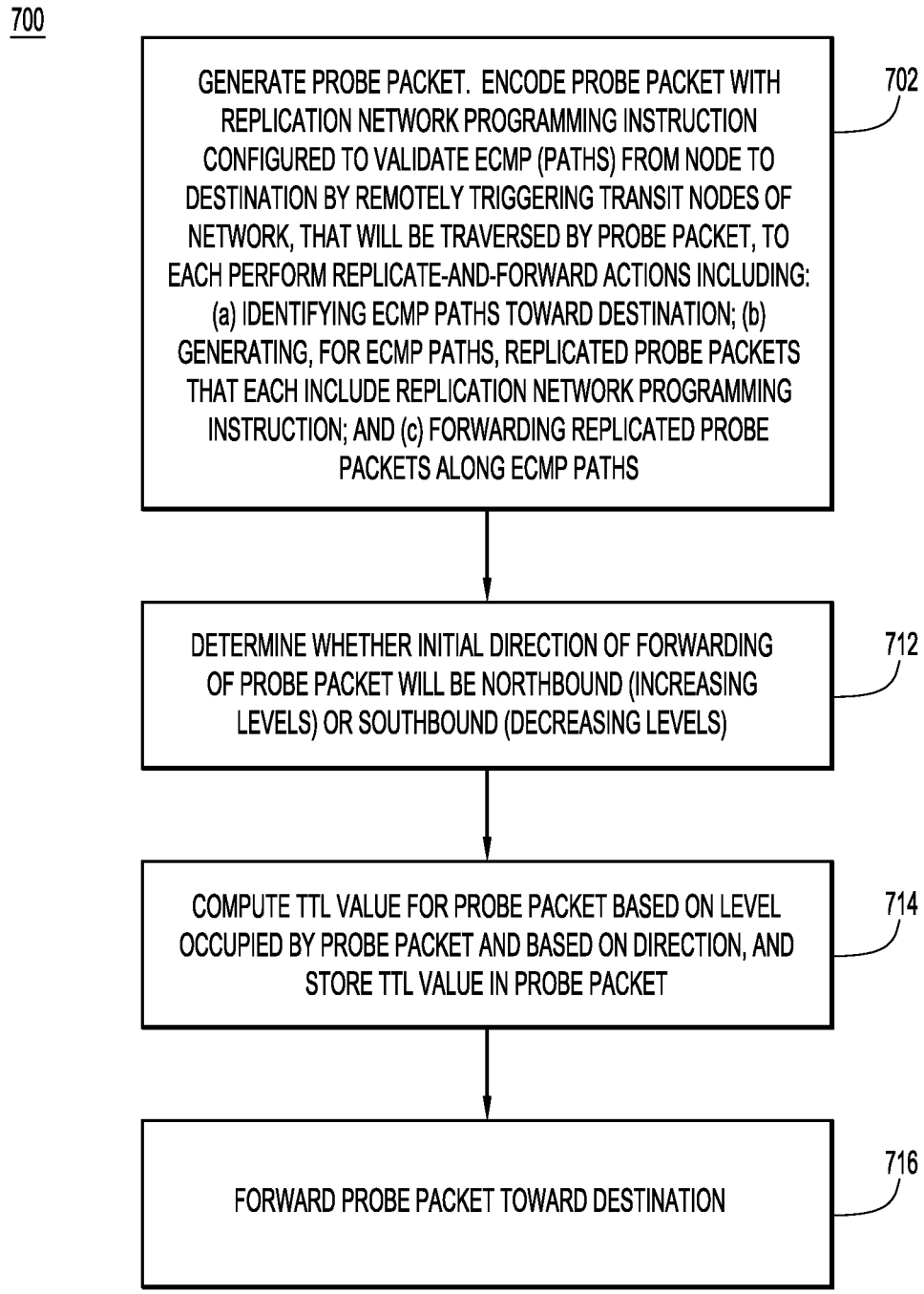
FIG. 7 is a flowchart of a method of validating ECMP paths in a network from a node to a destination using a replication network programming instruction and the new OAM probe technique, performed at an initiator node, according to an example embodiment.

With reference to FIG. 7, there is a flowchart of an example method 700 of validating ECMP paths in a network (e.g., network 100) from a node to a destination using a replication network programming instruction (e.g., the replication micro program that includes the uSID replication active block and the active SID) and the new probe technique. Method 700 includes operations described above, and may be performed by the node when the node operates as an initiator node, i.e., originates an initial probe packet. The network may be an SDN network configured to forward packets based on network programming instructions (e.g., micro programs) encoded in the packets. The network may include nodes that occupy hierarchical levels of a leaf-spine topology that increase in a northbound direction from a lowest level for leaf nodes to a highest level for spine nodes and that decrease in a southbound direction. The nodes of the network may implement a forwarding rule to avoid forwarding along suboptimal paths that include the reversal in forwarding direction described above. Method 700 helps the nodes adhere to the forwarding rule, and thus always forward over optimal paths.

At 702, the node generates a probe packet. The node encodes the probe packet with a replication network programming instruction configured to validate ECMP paths in the network from the node to a destination by remotely triggering transit nodes of the network, which will be traversed by the probe packet, to each perform a set of replicate-and-forward actions or operations. The destination may be a node of the network, a client device, server, or the like. A transit node is any node in the network traversed by the probe packet, but does not include the initiator and does not include the destination. The replication network programming instruction may be in the form of a micro program that includes a uSID replication active block concatenated with an active SID that identifies the destination. The operations triggered by the replication network programming instruction in each transit node include:

a. Identifying ECMP paths toward the destination, e.g., performing a lookup of the active SID in a local forwarding table to identify next hop ECMP entries leading to the destination.

b. Generating, for the identified ECMP paths, replicated probe packets that each include the replication network programming instruction. That is, the network programming instruction (e.g., uSID replication active block and active SID) is replicated in each of the replicated probe packets. This includes generating a number of replicated probe packets equal to a number of the identified ECMP paths.

c. Forwarding the replicated probe packets along respective ones of the identified ECMP paths.

At 712, the node determines whether an initial direction of forwarding the probe packet from the node will be in a northbound direction (increasing levels in the topology of the network) or in a southbound direction (decreasing levels). That is, the node determines whether the direction in which the forwarding the probe packet will occur is northbound or southbound.

At 714, the node computes, for the probe packet, a TTL value based on a level of the node in the leaf-spine topology, and based on the direction. For example, the TTL value is a mathematical function of the level or position of the node occupies, and differs depending on the direction. The TTL may be configured to expire when one of the replicated probe packets traverses a suboptimal non-ECMP path (along transit nodes) that includes a reversal in forwarding direction from southbound to northbound. The node stores the TTL value in the probe packet.

At 716, the node forwards the probe packet to a transit node toward the destination.

After forwarding the probe packet, the node receives from the transit nodes and/or the destination that receive the replicated probe packets, probe response packets that indicate successful or failed reachability to the destination via the ECMP paths.

Also, when a transit node receives the probe packet (or a replicated probe packet), responsive to the replication network programming instruction encoded in the probe packet (or the replicated probe packet), the transit node performs the replicate-and-forward actions.

Figure 8:
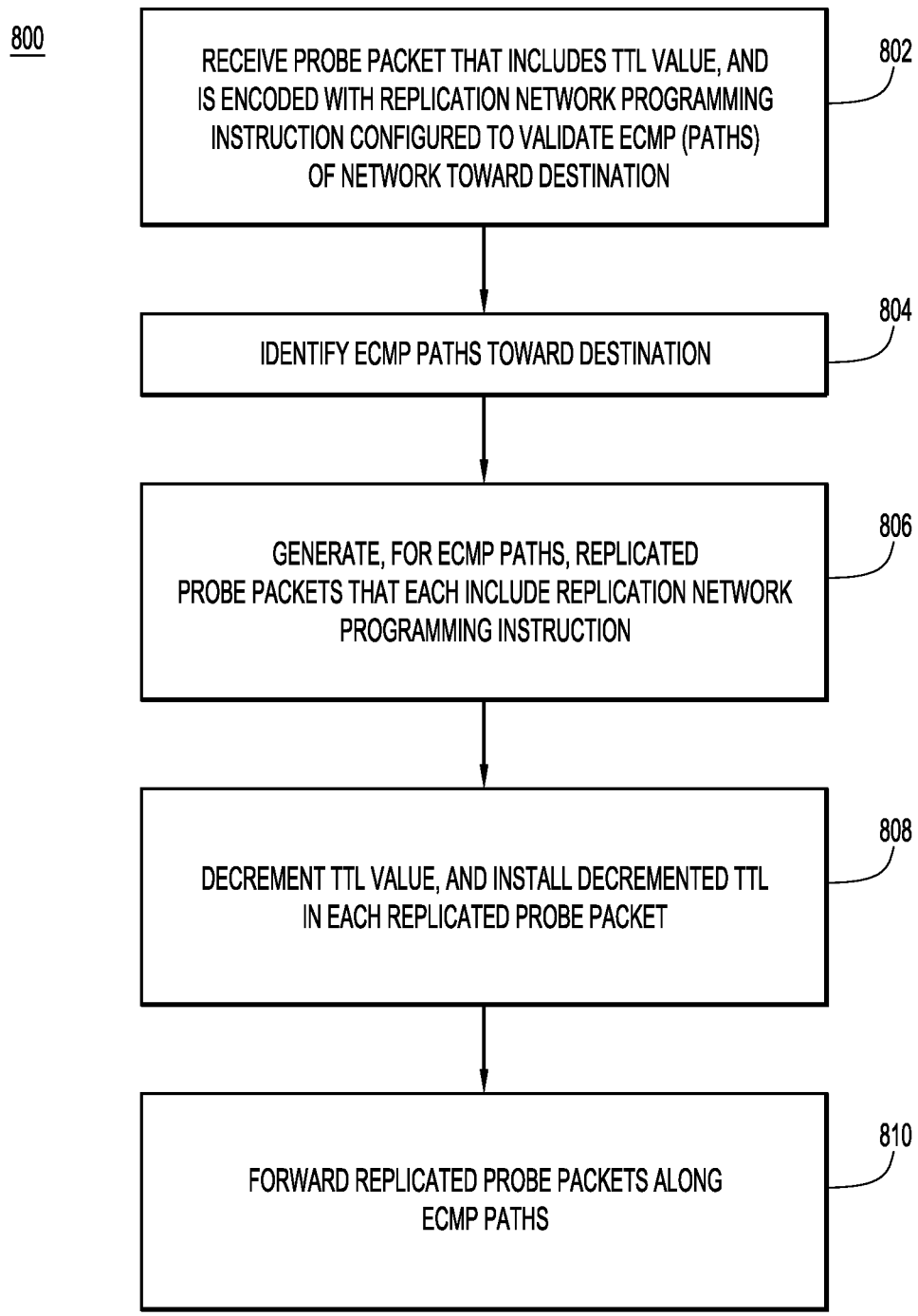
FIG. 8 is a flowchart of a method of validating ECMP paths in a network from a node to a destination using a replication network programming instruction, performed at a transit node, according to an example embodiment.

With reference to FIG. 8, there is a flowchart of an example method 800 of validating ECMP paths in a network from a node to a destination using a replication network programming instruction. Method 800 includes operations described above, and may be performed by the node when the node operates as a transit node.

At 802, the node receives, from a previous node in the network, a probe packet (which may be a replicated probe packet as described above) encoded with a replication network programming instruction configured to validate ECMP paths in the network toward a destination. The probe packet includes a TTL value. Responsive to the replication network programming instruction, the node performs next operations 804-810.

At 804, the node identifies ECMP paths toward the destination.

At 806, the node generates, for the ECMP paths, replicated probe packets that each include the replication network programming instruction.

At 808, the node decrements the TTL value, and installs the decremented TTL value in each replicated probe packet.

At 810, the node forwards the replicated probe packets along the identified ECMP paths.

Figure 9:
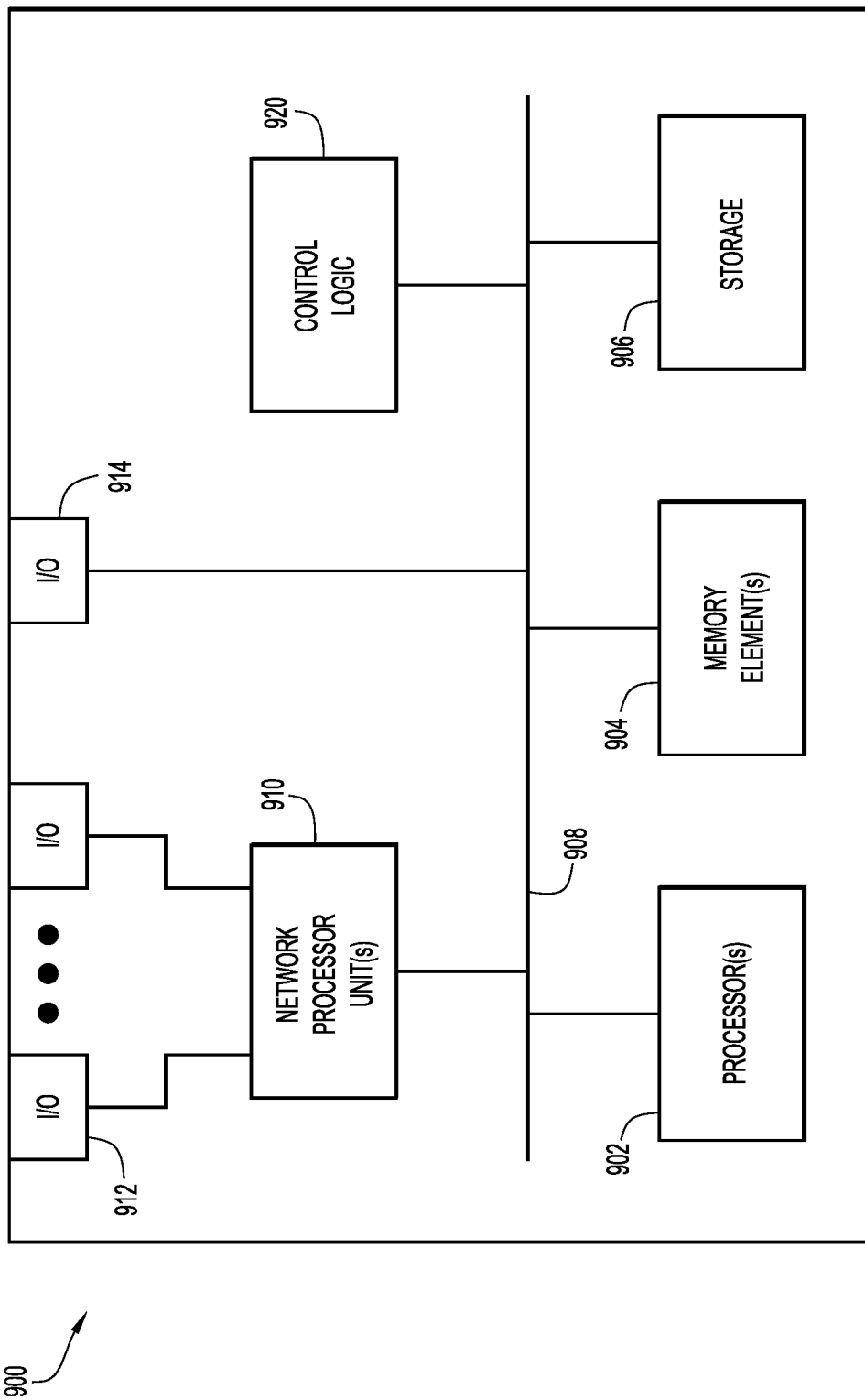
FIG. 9 is an illustration of a hardware block diagram of a computing device configured to perform operations for the embodiments presented herein, according to an example embodiment.

Referring to FIG. 9, there is an illustration of a hardware block diagram of a computing device configured to perform operations for the embodiments presented herein. In various embodiments, a computing device, such as computing device 900 or any combination of computing devices 900, may be configured as any entity/entities as discussed for the techniques depicted in connection with FIGS. 1-8 in order to perform operations of the various techniques discussed herein. For example, computing device 900 may represent or implement a network node of network 100 as described above.

In at least one embodiment, computing device may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory elements 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, radio ports, and/or any other I/O port(s) now known or hereafter developed. Thus, the network processor unit(s) 910 and/or network I/O interfaces 912 may include suitable interfaces for receiving, transmitting, and/or otherwise communicating data and/or information in a network environment.

I/O interface(s) 914 allow for input and output of data and/or information with other entities that may be connected to computer device 900. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory elements 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable.

For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 9) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In summary, embodiments presented herein provide network node self-test and assurance. The embodiments leverage segment routing to program a network instruction that performs ECMP replication. The instruction enables any node to trigger probing by an intermediate (transit) node to validate ECMP paths from the node. The embodiments employ a domain-wide unique uSID replication active block with a semantic of replicate an active-SID and forward (the replicated information) over all ECMP paths. Each initiator node uses its own level or position in the topology to compute a TTL value to be used in the probes. A combination of these features allow nodes to detect any network failures and thus avoid suboptimal routing.

In one aspect, a method is provided comprising: at a node of a network configured to forward packets based on network programming instructions encoded in the packets: generating a probe packet encoded with a replication network programming instruction configured to validate equal-cost multi-path (ECMP) routing in the network from the node to a destination by remotely triggering transit nodes of the network that are traversed by the probe packet, to each perform replicate-and-forward actions, including: identifying ECMP paths toward the destination; generating, for the ECMP paths, replicated probe packets that each include the replication network programming instruction; and forwarding the replicated probe packets along the ECMP paths; and forwarding the probe packet toward the destination.

In another aspect, an apparatus is provided comprising: multiple network input/output interfaces; and a processor coupled to the multiple network input/output interfaces and configured to communicate with a network configured to forward packets based on network programming instructions encoded in the packets, the processor further configured to perform: generating a probe packet encoded with a replication network programming instruction configured to validate equal-cost multi-path (ECMP) routing in the network to a destination by remotely triggering transit nodes of the network that are traversed by the probe packet, to each perform replicate-and-forward actions, including: identifying ECMP paths toward the destination; generating, for the ECMP paths, replicated probe packets that each include the replication network programming instruction; and forwarding the replicated probe packets along the ECMP paths; and forwarding the probe packet toward the destination.

In a further aspect, a method is provided comprising: at a node of a network configured to forward packets based on network programming instructions encoded in the packets: receiving, from a previous node in the network, a probe packet encoded with a replication network programming instruction configured to validate equal-cost multi-path (ECMP) routing in the network to a destination; and responsive to the replication network programming instruction: identifying ECMP paths toward the destination; generating, for the ECMP paths, replicated probe packets that each include the replication network programming instruction; and forwarding the replicated probe packets along the ECMP paths.

In yet another aspect, a non-transitory compute readable medium is provided. The medium is encoded with instructions that, when executed by a processor of a node of a network configured to forward packets based on network programming instructions encoded in the packets, cause the processor to perform the operations and methods described herein. For example, the instructions cause the processor to perform: generating a probe packet encoded with a replication network programming instruction configured to validate equal-cost multi-path (ECMP) routing in the network from the node to a destination by remotely triggering transit nodes of the network that are traversed by the probe packet, to each perform replicate-and-forward actions, including: identifying ECMP paths toward the destination; generating, for the ECMP paths, replicated probe packets that each include the replication network programming instruction; and forwarding the replicated probe packets along the ECMP paths; and forwarding the probe packet toward the destination.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a node of a network that is based on a segment routing architecture and configured to forward packets based on network programming instructions encoded in the packets:
   generating a probe packet encoded with a replication network programming instruction, including a unique micro segment identifier (SID) (uSID) replication active block and an active SID that identifies a destination, configured to validate equal-cost multi-path (ECMP) routing in the network from the node to the destination by remotely triggering transit nodes of the network that are traversed by the probe packet, to each perform replicate-and-forward actions, including:
   identifying ECMP paths toward the destination by performing a lookup of the active SID in an ECMP forwarding table;
   generating, for the ECMP paths, replicated probe packets that each include the replication network programming instruction;

forwarding the replicated probe packets along the ECMP paths; and
forwarding the probe packet toward the destination.

2. The method of claim 1, further comprising, at the node:
after forwarding the probe packet, receiving from the transit nodes and/or the destination that receive the replicated probe packets, probe response packets that indicate successful or failed reachability to the destination via the ECMP paths.

3. The method of claim 1, wherein:
the generating includes generating a number of replicated probe packets equal to a number of the ECMP paths; and
the forwarding the replicated probe packets includes forwarding the replicated probe packets on respective ones of the ECMP paths.

4. The method of claim 1, wherein the lookup includes a lookup of next hop ECMP entries based on the active SID.

5. The method of claim 1, wherein the node includes a router.

6. The method of claim 1, wherein:
the generating includes generating the replicated probe packets to each include the uSID replication active block and the active SID.

7. The method of claim 1, wherein the uSID replication active block includes a unique Internet Protocol (IP) version (v) 6 (IPv6) prefix for the uSID replication active block.

8. The method of claim 1, wherein the node is among nodes of the network that occupy levels of a leaf-spine topology that increase from a lowest level for leaf nodes to a highest level for spine nodes in a northbound direction and decrease in a southbound direction, and the method further comprises, at the node:
determining whether a direction in which the forwarding the probe packet will occur is southbound or northbound; and
computing for the probe packet a time-to-live (TTL) value based on a level of the node in the leaf-spine topology and the direction.

9. The method of claim 8, wherein the computing the TTL value includes:
when the direction is southbound, setting the TTL value equal to the level of the node.

10. The method of claim 8, wherein the computing the TTL value includes:
when the direction is northbound, setting the TTL value equal to 2*sn−n, where sn is the highest level and n is the level of the node.

11. The method of claim 1, wherein the node is among nodes of the network that occupy levels of a leaf-spine topology that increase in a northbound direction from a lowest level for leaf nodes to a highest level for spine nodes and decrease in a southbound direction, and the method further comprises, at the node:
computing for the probe packet a time-to-live (TTL) value configured to expire when one of the replicated probe packets traverses a suboptimal non-ECMP path that includes a reversal in a direction of forwarding from the southbound direction to the northbound direction.

12. The method of claim 1, further comprising, at each of the transit nodes:
receiving the probe packet or a replicated probe packet; and
responsive to the replication network programming instruction encoded in the probe packet or the replicated probe packet, performing the replicate-and-forward actions.

13. An apparatus comprising:
multiple network input/output interfaces; and
a processor coupled to the multiple network input/output interfaces and configured to communicate with a network that is based on a segment routing architecture and configured to forward packets based on network programming instructions encoded in the packets, the processor further configured to perform:
generating a probe packet encoded with a replication network programming instruction, including a unique micro segment identifier (SID) (uSID) replication active block and an active SID that identifies a destination, configured to validate equal-cost multi-path (ECMP) routing in the network to the destination by remotely triggering transit nodes of the network that are traversed by the probe packet, to each perform replicate-and-forward actions, including:
identifying ECMP paths toward the destination by performing a lookup of the active SID in an ECMP forwarding table;
generating, for the ECMP paths, replicated probe packets that each include the replication network programming instruction;
forwarding the replicated probe packets along the ECMP paths; and
forwarding the probe packet toward the destination.

14. The apparatus of claim 13, wherein the processor is configured to perform the lookup as a lookup of next hop ECMP entries based on the active SID.

15. The apparatus of claim 13, wherein:
the processor is configured to perform generating by generating a number of replicated probe packets equal to a number of the ECMP paths; and
the processor is configured to perform forwarding the replicated probe packets by forwarding the replicated probe packets on respective ones of the ECMP paths.

16. The apparatus of claim 13, wherein the uSID replication active block includes a unique Internet Protocol (IP) version (v) 6 (IPv6) prefix for the uSID replication active block.

17. The apparatus of claim 13, wherein the processor is implemented on a node among nodes of the network that occupy levels of a leaf-spine topology that increase from a lowest level for leaf nodes to a highest level for spine nodes in a northbound direction and decrease in a southbound direction, and the processor is further configured to perform:
determining whether a direction in which the forwarding the probe packet will occur is southbound or northbound; and
computing for the probe packet a time-to-live (TTL) value based on a level of the node in the leaf-spine topology and the direction.

18. A method comprising:
at a node of a network that is based on a segment routing architecture and configured to forward packets based on network programming instructions encoded in the packets:
receiving, from a previous node in the network, a probe packet encoded with a replication network programming instruction, including a unique micro segment identifier (SID) (uSID) replication active block and an active SID that identifies a destination, configured to validate equal-cost multi-path (ECMP) routing in the network to the destination; and
responsive to the replication network programming instruction:

identifying ECMP paths toward the destination by performing a lookup of the active SID in an ECMP forwarding table;

generating, for the ECMP paths, replicated probe packets that each include the replication network programming instruction; and forwarding the replicated probe packets along the ECMP paths.

19. The method of claim 18, wherein generating includes generating the replicated probe packets to each include the uSID replication active block and the active SID.

20. The method of claim 18, wherein the uSID replication active block includes a unique Internet Protocol (IP) version (v) 6 (IPv6) prefix for the uSID replication active block.

\* \* \* \* \*